United States Patent
Wang

(10) Patent No.: US 8,508,231 B2
(45) Date of Patent: *Aug. 13, 2013

(54) LOGGING TOOL EMPLOYING A MONOPOLE CURRENT INJECTION ELECTRODE FOR MICRORESISTIVITY IMAGING

(75) Inventor: Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/649,885

(22) Filed: Dec. 30, 2009

(65) Prior Publication Data

US 2011/0156711 A1    Jun. 30, 2011

(51) Int. Cl.
*G01V 3/00* (2006.01)
*E21B 47/00* (2012.01)

(52) U.S. Cl.
USPC .................. 324/366; 324/371; 175/50

(58) Field of Classification Search
USPC ................... 324/366–375; 175/50
See application file for complete search history.

(56) References Cited

U.S. PATENT DOCUMENTS

| | | | |
|---|---|---|---|
| 4,594,552 A | | 6/1986 | Grimaldi et al. |
| 4,968,940 A * | | 11/1990 | Clark et al. .................. 324/338 |
| 5,103,920 A * | | 4/1992 | Patton ............................ 175/45 |
| 5,235,285 A | | 8/1993 | Clark et al. |
| 5,339,037 A | | 8/1994 | Bonner et al. |
| 5,473,158 A | | 12/1995 | Holenka et al. |
| 5,510,712 A * | | 4/1996 | Sezginer et al. .............. 324/368 |
| 6,061,634 A * | | 5/2000 | Belani et al. ..................... 702/12 |
| 6,173,793 B1 | | 1/2001 | Thompson et al. |
| 6,191,588 B1 | | 2/2001 | Chen |
| 6,359,438 B1 | | 3/2002 | Bittar |
| 6,373,254 B1 | | 4/2002 | Dion et al. |
| 6,600,321 B2 | | 7/2003 | Evans |
| 6,714,014 B2 | | 3/2004 | Evans et al. |
| 6,765,386 B2 | | 7/2004 | Gianzero et al. |
| 6,891,377 B2 | | 5/2005 | Cheung et al. |
| 6,985,086 B2 * | | 1/2006 | Tang et al. ................. 340/854.4 |
| 7,027,926 B2 | | 4/2006 | Haugland |
| 7,046,010 B2 | | 5/2006 | Hu et al. |
| 7,066,282 B2 | | 6/2006 | Chen et al. |
| 7,098,664 B2 * | | 8/2006 | Bittar et al. .................... 324/367 |
| 7,242,194 B2 | | 7/2007 | Hayman et al. |
| 7,250,768 B2 | | 7/2007 | Ritter et al. |
| 7,256,582 B2 | | 8/2007 | Gorek et al. |
| 7,265,553 B2 | | 9/2007 | Cheung et al. |
| 7,284,605 B2 | | 10/2007 | Clark et al. |
| 7,340,384 B2 * | | 3/2008 | Delhomme et al. ............ 703/10 |
| 7,545,145 B2 | | 6/2009 | Wang |
| 7,558,675 B2 | | 7/2009 | Sugiura |
| 8,305,083 B2 * | | 11/2012 | Wang ............................ 324/369 |
| 8,319,498 B2 * | | 11/2012 | Wang ............................ 324/369 |
| 8,362,781 B2 * | | 1/2013 | Reiderman .................... 324/346 |

(Continued)

OTHER PUBLICATIONS

International Search Report for International Application No. PCT/US2010/061490 dated Aug. 4, 2011.

*Primary Examiner* — Joshua Benitez Rosario
(74) *Attorney, Agent, or Firm* — Kenneth Liu

(57) ABSTRACT

A microresistivity logging tool includes a monopole current injection electrode and first and second potential electrodes deployed on a downhole tool body. A controller is configured to apply a high frequency alternating current between the monopole current injection electrode and a return and measure a corresponding AC potential difference between the first and second electrodes.

16 Claims, 4 Drawing Sheets

(56) References Cited

U.S. PATENT DOCUMENTS

| | | | |
|---|---|---|---|
| 8,390,295 B2* | 3/2013 | Gorek et al. | 324/373 |
| 2007/0103161 A1* | 5/2007 | San Martin et al. | 324/366 |
| 2008/0128166 A1 | 6/2008 | Forgang et al. | |
| 2008/0315884 A1* | 12/2008 | Bittar et al. | 324/366 |
| 2009/0085570 A1 | 4/2009 | Signorelli et al. | |
| 2009/0224766 A1* | 9/2009 | Wang et al. | 324/366 |

* cited by examiner

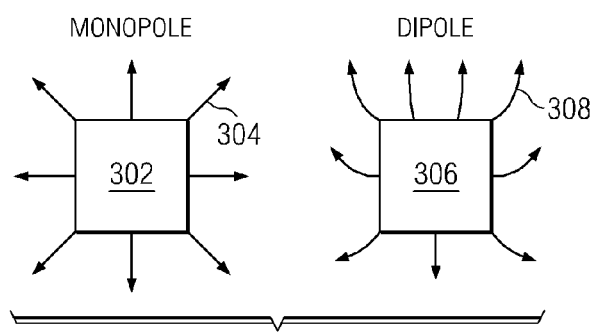
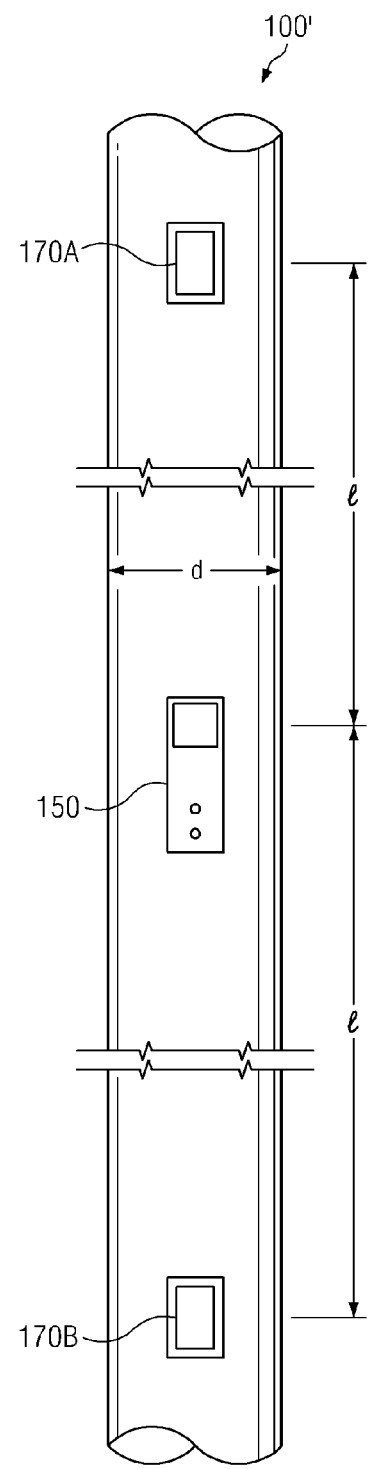

LOGGING TOOL EMPLOYING A MONOPOLE CURRENT INJECTION ELECTRODE FOR MICRORESISTIVITY IMAGING

RELATED APPLICATIONS

None.

FIELD OF THE INVENTION

The present invention relates generally to microresistivity logging measurements. More particularly, embodiments of this invention relate to a logging tool including a monopole current injection electrode.

BACKGROUND OF THE INVENTION

The use of electrical measurements in prior art downhole applications, such as logging while drilling (LWD) and wireline logging applications, is well known. Such techniques may be utilized to determine a subterranean formation resistivity, which, along with formation porosity measurements, may be used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Techniques for making microresistivity measurements of a subterranean formation are well known in the prior art for both wireline and LWD operations. For example, microresistivity sensors configured for use with non-conductive drilling fluid commonly include at least four electrodes (and may therefore be referred to in the art as "four terminal" devices): including a pair of spaced potential electrodes deployed between current injection electrode and return electrodes. In use, alternating current is passed between the injector and return electrodes and the potential difference (voltage drop) between the potential electrodes is measured. The formation resistivity in the region of the potential electrodes may then be calculated from the measured potential difference. Those of ordinary skill will appreciate that the formation resistivity tends to be approximately proportional to the measured difference.

While such "four terminal" measurements have been utilized commercially, there remains room for further improvement. For example, conventional four terminal sensors typically require the potential electrodes to be located between the current injection electrode and the return electrode. Relaxing this constraint may be desirable in certain applications. Moreover, there is a need to remove biases caused by a closely placed return electrode on the measurement response so that the measurement is sensitive only to the formation volume immediately around the injection and potential electrodes.

SUMMARY OF THE INVENTION

Aspects of the present invention are intended to address the above described need for microresistivity logging tools having improved sensors. In one exemplary embodiment, a microresistivity logging tool includes a sensor having a monopole current injection electrode and first and second potential electrodes. The logging tool is configured for use in nonconductive drilling fluid and may further include a remote return electrode, for example, axially spaced apart from the current injection electrode. A controller is configured to apply a high frequency alternating current between the monopole current injection electrode and a return (e.g., a return electrode) and measure a corresponding potential difference between the first and second electrodes.

Exemplary embodiments of the present invention may advantageously provide several technical advantages. For example, tools in accordance with the present invention make use of a monopole current injection electrode. A monopole current injection electrode produces more evenly distributed current in the formation around the injection electrode than, e.g., a four-terminal tool does. The use of a monopole electrode also enables the potential electrodes to be deployed on the tool body with fewer constraints regarding their location and alignment directions.

Tool embodiments in accordance with the invention may also employ a remote return electrode (e.g., located at a practical electrical infinity with respect to the current injection electrode). The use of a remote return electrode tends to eliminate biases to the potential measurement caused by heterogeneities near the return electrode. The resulting measurement may thus be made sensitive only to the formation volume immediately around the injection electrode.

In one aspect the present invention includes a microresistivity logging tool including a logging tool body. A monopole current injection electrode is configured to inject electrical current into a formation in the vicinity of first and second spaced potential electrodes. A controller is configured to (i) apply an alternating current between the monopole current injection electrode and a return and (ii) measure a corresponding potential difference between the first and second electrodes.

In another aspect, the present invention includes a logging while drilling microresistivity tool. The LWD tool includes a monopole current injection electrode configured to inject electrical current into a formation, a return electrode spaced apart from the current injection electrode and configured to provide a return path for the electrical current injected by the current injection electrode, and first and second spaced potential electrodes. A controller is configured to (i) apply an alternating current between the monopole current injection electrode and the return electrode and (ii) measure a corresponding potential difference between the first and second electrodes.

In still another aspect, the present invention includes a method for making a microresistivity measurement in a nonconductive drilling fluid. The method includes deploying a logging while drilling tool in a subterranean borehole including nonconductive drilling fluid. The tool includes a monopole current injection electrode and first and second spaced potential electrodes deployed on a logging while drilling tool body. The method further includes causing the monopole current injection electrode to inject a high frequency alternating current into the borehole such that the current has a dipole impurity of less than about 5% and causing the first and second spaced potential electrodes to measure a corresponding potential difference.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 depicts a schematic comparison of monopole and dipole electrodes.

FIG. 6 depicts an alternative embodiment of a microresistivity logging tool in accordance with the present invention.

DETAILED DESCRIPTION

Figure 1:
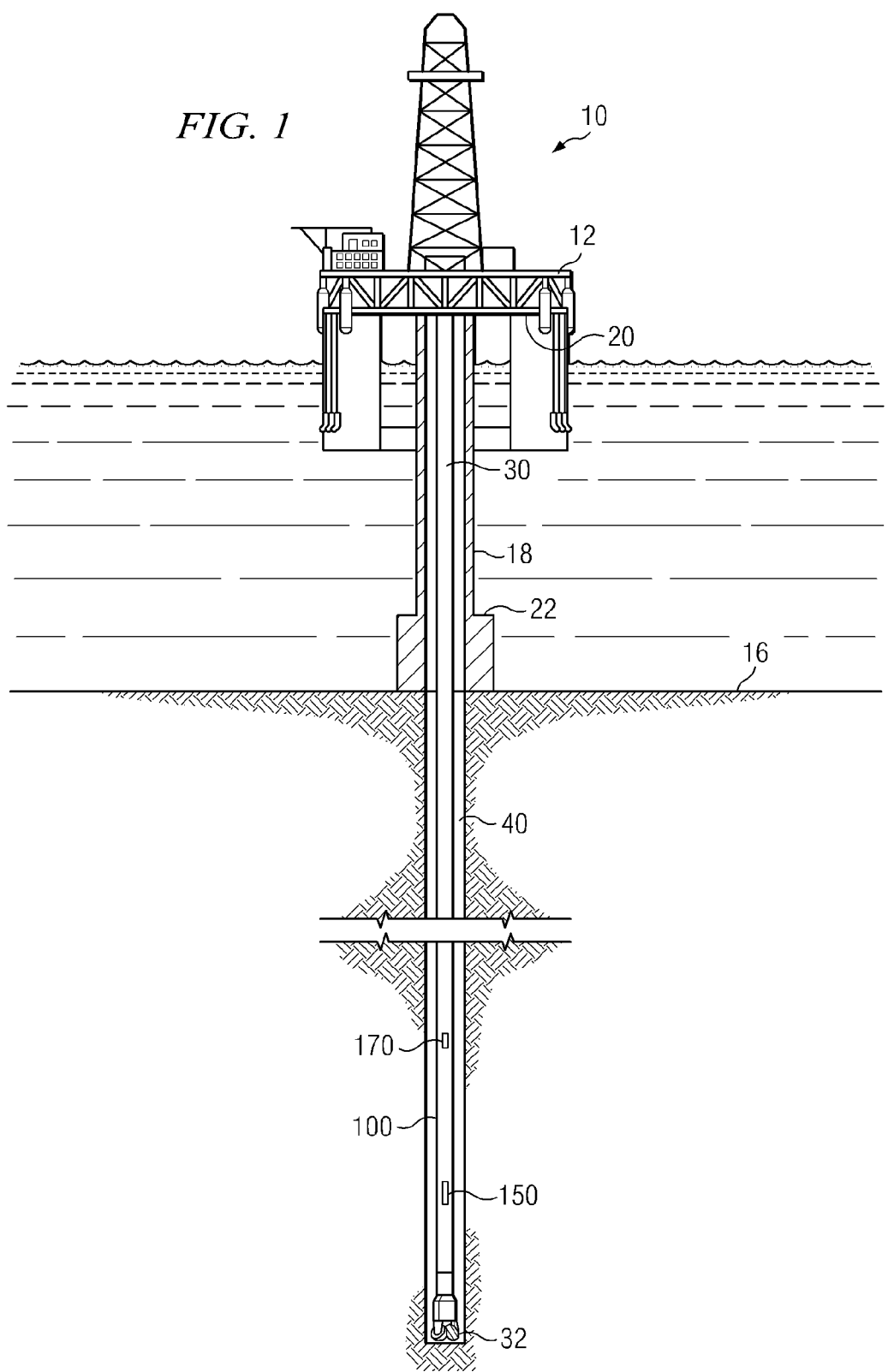
FIG. 1 depicts a conventional drilling rig on which exemplary embodiments of the present invention may be utilized.

Referring now to FIGS. 1 through 7, exemplary embodiments of the present invention are depicted. With respect to FIGS. 1 through 7, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 7 may be described herein with respect to that reference numeral shown on other views.

FIG. 1 depicts one exemplary embodiment of a microresistivity logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Exemplary embodiments of LWD tool 100 include at least one microresistivity sensor 150 and a remote return electrode 170. Drill string 30 may further include, for example, a downhole drill motor, a mud pulse telemetry system, a steering tool, and/or one or more of numerous other MWD and LWD sensors for sensing downhole characteristics of the borehole and the surrounding formation.

It will be understood by those of ordinary skill in the art that the deployment depicted on FIG. 1 is merely exemplary for purposes of describing the invention set forth herein. It will be further understood that logging tools in accordance with the present invention are not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline microresistivity tools.

Figure 2:
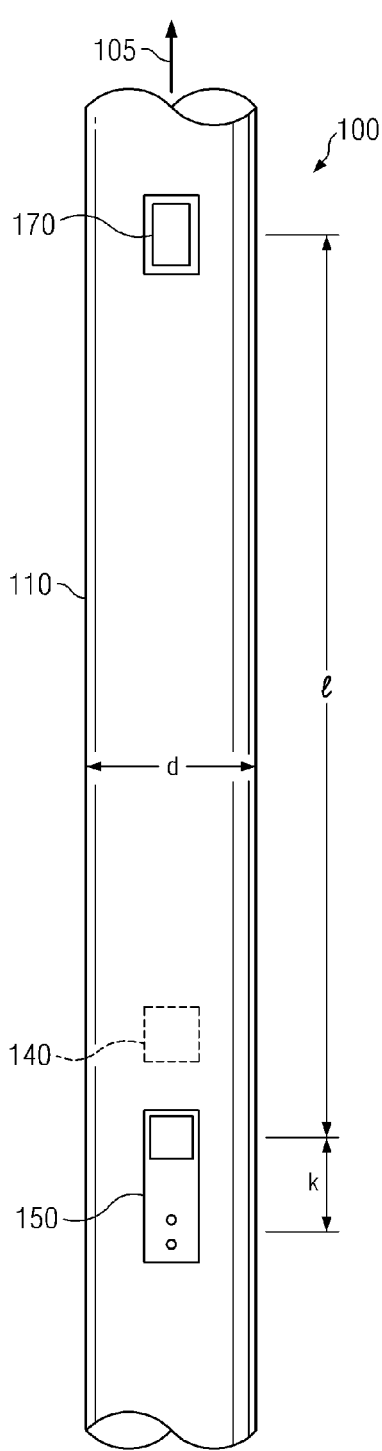
FIG. 2 depicts one exemplary embodiment of a microresistivity logging tool in accordance with the present invention.

FIG. 2 depicts a portion of one exemplary embodiment of logging tool 100. As described above with respect to FIG. 1, logging tool 100 includes a microresistivity sensor 150 and a remote return electrode 170 deployed on an LWD tool body 110. While the return electrode 170 is depicted on tool body 110, it will be understood that it may also be deployed elsewhere in the drill string, e.g., in another tool in the bottom hole assembly. Moreover, while not depicted on FIG. 2, it will be understood that one or both of the sensor 150 and the return electrode 170 may be advantageously deployed, for example, in a stabilizer blade or an enlarged diameter sleeve so as to reduce the standoff distance between the sensor 150 and the borehole wall. Such deployments are commonly preferred in applications in which an oil based (nonconductive) drilling fluid is utilized.

In the exemplary embodiment depicted, a long axis of the microresistivity sensor is substantially parallel with a longitudinal axis 105 of the tool 100. Moreover, in the exemplary embodiment depicted on FIG. 2, the sensor 150 and the return electrode 170 are deployed at the same tool face (i.e., at the same circumferential position on the tool body). It will be understood that the invention is not limited in these regards.

LWD tool 100 may optionally further include an azimuth sensor 140 configured to measure the azimuth angle (toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

Figure 3:
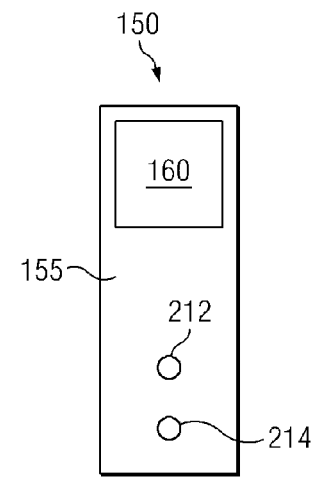
FIG. 3 depicts the exemplary microresistivity sensor embodiment shown on FIG. 2.

With continued reference to FIG. 2 and further reference now to FIG. 3, sensor 150 includes a current injection electrode 160 and first and second spaced potential electrodes 212 and 214. The current injection electrode 160 is configured to inject a high frequency alternating electrical current into a subterranean formation (and may therefore be electrically connected with a high frequency alternating current supply as described in more detail below with respect to FIG. 4). The potential electrodes 212 and 214 are spaced apart and electrically isolated from the current injection electrode via conventional insulating material 155. In the exemplary embodiment depicted the current injection electrode 160 is deployed between the return electrode 170 and potential electrodes 212 and 214.

Figure 4:
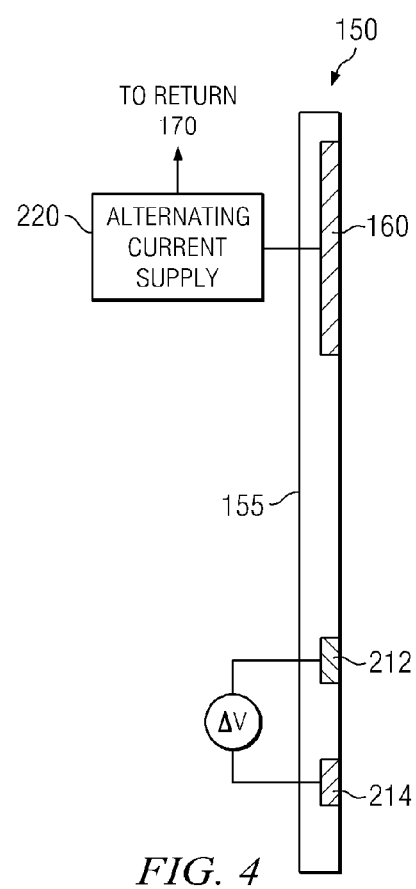
FIG. 4 depicts a longitudinal cross sectional view of the microresistivity sensor shown on FIG. 3.

FIG. 4 depicts a longitudinal cross section of the sensor embodiment 150 depicted on FIG. 3. While not depicted on FIG. 4, the logging tool 100 further includes a controller including a high frequency alternating current supply 220, opposing poles of which are electrically connected to the current injection electrode 160 and the return electrode 170. The current supply 220 is typically configured to apply a predetermined high frequency alternating current between electrodes 160 and 170 (e.g., having a frequency in the range from about 0.1 to about 10 MHz). The controller may be further configured to measure an AC potential difference (an AC voltage drop) between the first and second potential electrodes (e.g., via a conventional high impedance voltmeter) and to compute a resistivity value from the measured potential difference. Techniques for measuring the voltage drop and computing a resistivity value are well known in the art and are therefore discussed no further herein.

In exemplary embodiments of the present invention, the return electrode 170 is spaced apart from the current injection electrode 160 such that the current injection electrode 160 functions as a substantially pure monopole electrode. By monopole it is meant that current injection electrode 160 emits a substantially uniform current (i.e., such that the current density is substantially equal in all directions). In contrast to a monopole source, a dipole source is influenced by the presence (the location or position) of the return electrode such that the emitted current is non-uniform (i.e., greater in one direction than in another). By referring to electrode 160 as being a substantially pure monopole it is meant that the current injection electrode 160 has a dipole impurity of less than about 5% and preferably less than about 2%.

This distinction between monopole and dipole electrodes is now described in more detail by way of the schematic current injection electrodes depicted on FIG. 5. As stated above (and schematically depicted on FIG. 5), a monopole current injection electrode 302 emits a substantially uniform current 304 outward from the electrode. In contrast, a dipole current injection electrode 306 emits a non-uniform current 308 outward from the electrode. In the schematic depiction shown on FIG. 5, the dipole injector is coupled with a return electrode (not shown on FIG. 5) located above the injector. The proximity of the return draws current preferentially upwards in this example.

With reference again to FIG. 2, one way to achieve a substantially pure monopole current injection electrode is to locate the return electrode 170 at electrical infinity with respect to the current injection electrode 160. In nonconductive (oil based) drilling fluid, this may be practically accomplished, for example, when a ratio of the axial separation distance l between the current injection electrode 160 and the return electrode 170 to a diameter d of the drill collar (ratio l/d) is greater than about 5. This ratio (l/d) is preferably greater than about 10. In certain embodiments, the l/d ratio may be greater than about 20, or even greater than about 50.

Location of the return electrode 170 at electrical infinity may also be practically accomplished when the ratio of the axial separation distance l to the separation distance k between the current injection electrode 160 and the potential electrodes 212 and 214 (ratio l/k) is greater than about 5. This ratio (l/k) is also preferably greater than about 10. In certain embodiments, the l/k ratio may be greater than about 20, or even greater than about 50.

It will be appreciated that logging tool embodiments in accordance with the present invention are not limited to embodiments including a single return electrode. For example, FIG. 6 depicts an alternative tool embodiment 100' including first and second return electrodes 170A and 170B deployed axially above and below the sensor 150. While not shown in FIG. 6, return electrodes 170A and 170B are both connected to alternating current supply 220. The use of first and second return electrodes 170A and 170B may advantageously improve the uniformity of the injected current and may therefore be preferable in certain logging operations. In the exemplary embodiment depicted the sensor 150 is deployed symmetrically between the return electrodes 170A and 170B, although the invention is not limited in this regard.

Figure 7A:
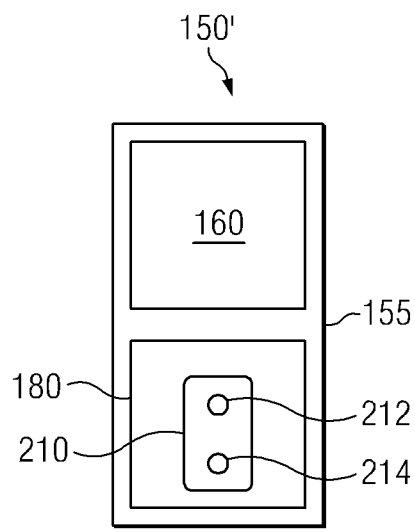
FIGS. 7A and 7B (collectively FIG. 7) depict alternative sensor embodiments employing shielding in accordance with the present invention.
Figure 7B:
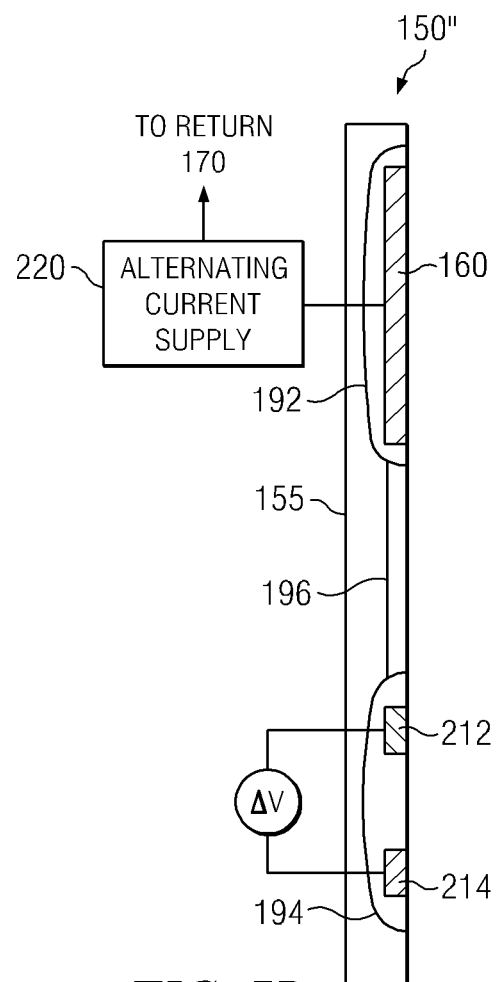

FIGS. 7A and 7B (collectively FIG. 7) depict alternative sensor embodiments 150' and 150" that incorporate shielding. In FIG. 7A, sensor embodiment 150' includes a shield electrode 180 deployed on an outer face of the sensor adjacent to and electrically isolated from the monopole current injection electrode 160. The potential electrodes 212 and 214 are deployed in and electrically isolated from the shield electrode as depicted. In FIG. 7B, sensor embodiment 150" includes grounded internal shielding 192 and 194 covering the internal portions of the current injection electrode and the potential electrodes. In the exemplary embodiment depicted, a first shield 192 is deployed internally about the monopole current injection electrode 160 and a second shield 194 is deployed internally about the potential electrodes 212 and 214. The first and second shields are electrically connected to one another as depicted at 196.

Those of skill in the art will appreciate that the use of electrically conductive shielding (e.g., as depicted on FIGS. 7A and/or 7B) may be advantageous in certain operations. For example, when used with non-conductive drilling fluid the shielding may advantageously remove the spurious electric field caused by displacement currents in the sensor and in the drilling fluid since induced displacement currents can not penetrate a metallic sheet.

In the exemplary sensor embodiments depicted on FIGS. 3, 4, and 7, the potential electrodes 212 and 214 are depicted as being axially spaced apart. It will be understood that the invention is not limited in this regard.

With reference again to FIGS. 2 and 4, measurement tool 100 commonly includes an additional controller or a controller with additional functionality. A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity measurements while drilling. As such the controller may further be configured to: (i) inject an alternating electrical current into a formation at the monople current injection electrode, (ii) measure a potential difference between the potential electrodes, and (iii) compute an apparent resistivity using the measured potential difference.

A suitable controller 250 may also be configured to construct LWD microresistivity images of the subterranean formation. In such imaging applications, the microresistivity measurements may be acquired and correlated with corresponding azimuth measurements (obtained, for example, from the directional sensors 140 deployed in the tool 100) while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions.

A suitable controller may also optionally include other controllable components, such as other sensors, data storage devices, power supplies, timers, and the like. As described above, the controller is disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling, for example, by enabling measured and/or computed parameters to be transmitted to the surface. These parameters may be used, for example, to make steering decisions during drilling. A controller may further optionally include volatile or non-volatile memory or a data storage device for downhole storage of measured potentials, microresistivity values, and/or borehole images. The invention is not limited in these regards.

Although the present invention and its advantages have been described in detail, it should be understood that various changes, substitutions and alternations can be made herein without departing from the spirit and scope of the invention as defined by the appended claims.

I claim:

1. A downhole microresistivity logging tool comprising:
   a logging tool body;
   a monopole current injection electrode configured to inject electrical current into a formation;
   a return electrode, the return electrode providing a return path for the electrical current injected by the monopole current injection electrode, the return electrode deployed in the tool body and spaced apart from the monopole current injection electrode;
   first and second spaced potential electrodes; and
   a controller configured to (i) apply a high frequency alternating current between the monopole current injection electrode and the fail return electrode and (ii) measure a corresponding AC potential difference between the first and second potential electrodes.

2. The logging tool of claim 1, wherein a ratio of an axial separation distance between the monopole current injection electrode and the return electrode to a diameter of the logging while drilling, tool body is at least five.

3. The logging tool of claim 2, wherein the ratio is at least 10.

4. The logging tool of claim 1, wherein a ratio of an axial separation distance between the monopole current injection electrode and the return electrode to a separation distance between the monopole current injection electrode and the potential electrodes is at least five.

5. The logging tool of claim 4, wherein the ratio is at least 10.

6. The logging tool of claim 1, wherein the monopole current injection electrode is deployed axially between the potential electrodes and the return electrode.

7. The logging tool of claim further comprising first and second return electrodes, the first and second return electrodes providing corresponding first and second return paths for the electrical current injected by the monopole current injection electrode, the monopole current injection electrode deployed axially between the first and second return electrodes.

8. The logging tool of claim 1, wherein the monopole current injection electrode and the first and second potential electrodes comprise a microresistivity sensor which is deployed on the tool body; the microresistivity sensor being axially spaced apart from the return electrode.

9. The logging tool of claim 1, further comprising a shield electrode deployed adjacent to the monopole current injection electrode, the potential electrodes being deployed in and electrically isolated from the shield electrode, the shield electrode being electrically connected to the tool body.

10. The logging while drilling tool of claim 1, further comprising a first internal shield deployed about the monopole current injection electrode and a second internal shield deployed about the potential electrodes, the first and second shields being electrically connected to one another and to the tool body.

11. The logging tool of claim 1, wherein the controller is further configured to relate the AC potential difference to a resistivity of the formation.

12. The logging tool of claim 1, further comprising an azimuth sensor configured to measure an azimuth angle of the measuring electrode.

13. The logging tool of claim 1, wherein the high frequency alternating current has a frequency in the range from about 0.1 to about 10 MHz.

14. A logging while drilling microresistivity tool comprising:
   a logging while drilling tool body a monopole current injection electrode configured to inject electrical current into a formation;
   first and second return electrodes configured to provide a corresponding first and second return paths the electrical current injected by the monopole current injection electrode, the first and second return electrodes deployed in the tool body and spaced apart from the monopole current injection electrode, the current injection electrode deployed axially between the first and second return electrodes;
   first and second spaced potential electrodes; and
   a controller configured to (i) apply a high frequency alternating current between the monopole current injection electrode and the return electrode and (ii) measure a corresponding AC potential difference between the first and second electrodes.

15. The logging tool of claim 14, wherein a ratio of an axial separation distance between the monopole current injection electrode and the first return electrode to a diameter of the logging while drilling tool body is at least 10.

16. The logging tool of claim 14, wherein a ratio of an axial separation distance between the monopole current injection electrode and the first return electrode to a separation distance between the monopole current injection electrode and the potential electrodes is at least 10.

* * * * *